United States Patent [19]

Pescher et al.

[11] Patent Number: 5,204,074

[45] Date of Patent: Apr. 20, 1993

[54] RECOVERY OF GALLIUM VALUES FROM BASIC AQUEOUS SOLUTIONS THEREOF

[75] Inventors: Yvette Pescher, Bagneux; Jean-Louis Sabot, Maisons Laffitte, both of France

[73] Assignee: Rhone-Poulenc Chimie, Courbevoie, France

[21] Appl. No.: 613,064

[22] Filed: Nov. 15, 1990

[30] Foreign Application Priority Data

Nov. 15, 1989 [FR] France .................... 89 14985

[51] Int. Cl.⁵ .................... C01G 15/00; C22B 58/00
[52] U.S. Cl. .................... 423/112; 423/111; 423/112; 423/131; 423/DIG. 14; 423/624
[58] Field of Search ............... 423/112, 122, 131, 624, 423/DIG. 14, 111; 210/634

[56] References Cited

U.S. PATENT DOCUMENTS

| | | | |
|---|---|---|---|
| 4,169,130 | 11/1979 | Helgorsky et al. | 423/112 |
| 4,724,129 | 2/1988 | Helgorsky et al. | 423/112 |
| 4,999,171 | 3/1991 | Kato et al. | 423/112 |

FOREIGN PATENT DOCUMENTS 63-224735 11/1988 Japan .

OTHER PUBLICATIONS

European Patent Application, 0234319, published Feb. 9, 1987.

*Primary Examiner*—Theodore Morris
*Assistant Examiner*—Edward Squillante
*Attorney, Agent, or Firm*—Burns, Doane, Swecker & Mathis

[57] ABSTRACT

Gallium values are recovered from basic aqueous solutions thereof, e.g., Bayer liquors, by (i) contacting such basic aqueous solution (A) with a medium (I) containing a gallium extractant, whereby the gallium values are transferred to the medium (I), (ii) contacting such gallium-enriched medium (I) with a basic aqueous solution (B) and back-extracting the gallium values into the basic aqueous solution (B), (iii) contacting such gallium-enriched basic aqueous solution (B) with a second medium (II) containing a gallium extractant, whereby the gallium values are transferred to the medium (II), and (iv) contacting such gallium-enriched medium (II) with an aqueous solution (C), which may be acidic or basic, and back-extracting the gallium values into the aqueous solution (C); such gallium-enriched aqueous solution (C) may, for example, be directly electrolyzed to produce gallium metal 26 Claims, 1 Drawing Sheet

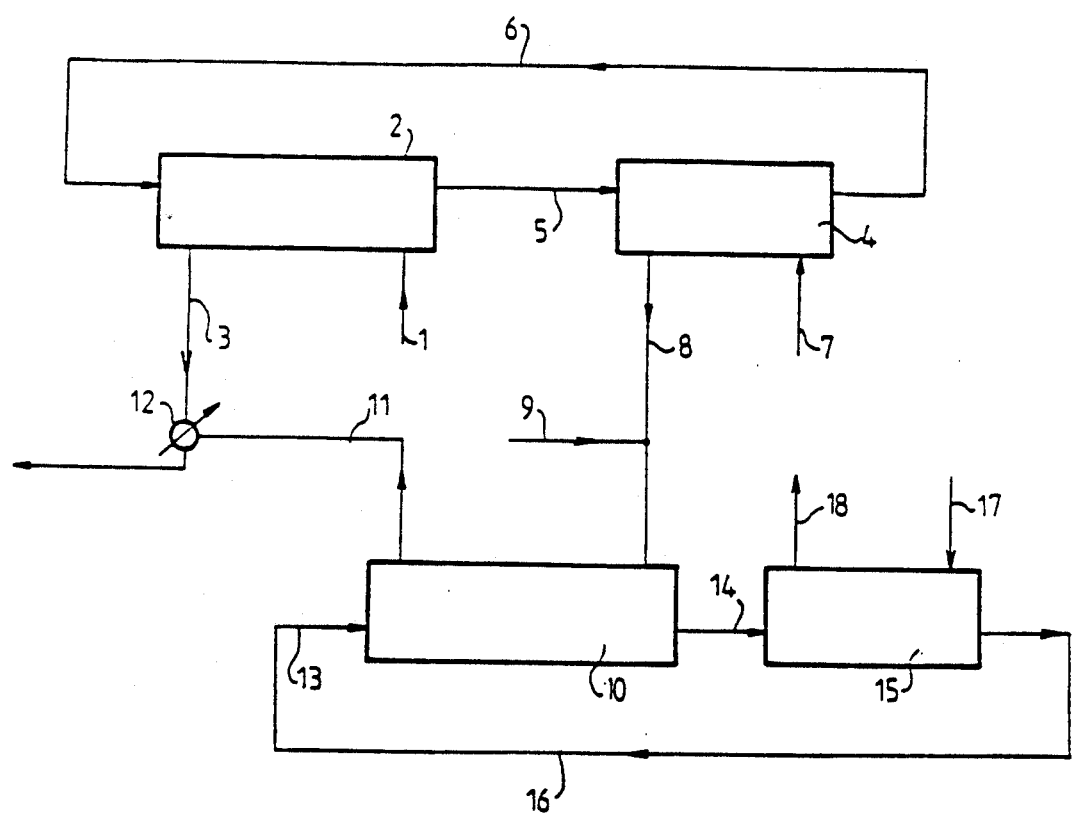

RECOVERY OF GALLIUM VALUES FROM BASIC AQUEOUS SOLUTIONS THEREOF

BACKGROUND OF THE INVENTION

1. Field of the Invention

The present invention relates to the recovery of gallium values from basic solutions containing such values, for example the sodium aluminate solutions emanating from the Bayer process for the production of alumina.

This invention especially relates to the extraction of gallium values from solutions comprised thereof by means of a substituted hydroxyquinoline extractant.

2. Description of the Prior Art

The recovery of the gallium values present in alkaline aqueous solutions via liquid/liquid extraction by contacting such solutions with an organic phase containing an extracting agent (extractant) and an organic solvent, and back-extracting the gallium values by washing the organic phase into which said gallium values have been transferred with an aqueous acid solution, is known to this art; compare French Patents Nos. 2,277,897, 2,307,047, 2,307,882, 2,495,601, 2,532,295 and 2,532,296.

It is also known to this art to employ a resin as a support for the extracting agent and to extract the gallium values by flowing the alkaline solution over this resin. Analogously, the gallium values are recovered by washing the resin charged with gallium with an acid solution. Thus, published Japanese Patent Applications No. 60/042,234 and No. 58/96,831 and published European Patent Applications Nos. 258,146 and 265,356 present examples of suitable resins which can be used as supports for the extractant, which extractant is identical to that used in the above liquid/liquid extraction process.

These processes of liquid/liquid extraction or flow over a resin containing the extracting agent entail, in brief, transferring the gallium values contained in the basic solution into the medium (organic phase or resin) containing the extractant by intimately contacting these two media with each other. In a second step, the gallium values are back-extracted by contacting the medium (organic phase or resin) charged with the gallium values with an aqueous acid solution. The acid solution thus recovered can then be purified by numerous processes to remove the cations co-extracted with the gallium, such as, for example, sodium and aluminum. The purification processes described in French Patents Nos. 2,495,599, 2,495,600 and 2,495,601, assigned to the assignee hereof, are exemplary.

The purified solution then serves as a starting material for the production of gallium metal or of compounds containing gallium.

Gallium is generally present in the form of impurities in natural minerals and, more particularly, in the aluminum minerals such as the bauxites.

Consequently, the major proportion of the gallium produced is recovered from the sodium aluminate solution or Bayer liquor circulating in the Bayer process for the recovery of alumina.

After recovery of the gallium, such Bayer liquor is recycled back into the Bayer process cycle.

As this Bayer liquor is very highly basic, a significant amount of sodium ions will be extracted when it is contacted with the extracting medium, rendering the latter likewise highly basic. It is therefore necessary, in the processes currently characterizing the state of this art, to neutralize such basicity during the back-extraction of the gallium by means of an acid solution, thus necessitating consumption of a great amount of acid.

Moreover, it will also be necessary to adjust the pH of the Bayer liquor recycled back into the alumina production cycle, by the addition of sodium hydroxide thereto, in order not to disrupt proper operation of this cycle.

SUMMARY OF THE INVENTION

Accordingly, a major object of the present invention is the provision of an improved process for the recovery of gallium values from basic solutions comprised thereof, which improved process permits the consumption of acid to be significantly reduced and the quality of the recycled Bayer liquor to be markedly improved.

Briefly, the present invention features a process for the recovery of gallium values from a basic aqueous solution (A) containing such values, comprising contacting said basic solution (A) with a medium (I) which comprises an extractant for such gallium values, whereby said gallium values are transferred from the solution (A) into the medium (I) and, after phase separation of the medium (I) from the solution (A), back-extracting the gallium values by contacting the medium (I) enriched in gallium values with an aqueous phase (B) and separating the medium (I) from the aqueous phase (B).

BRIEF DESCRIPTION OF THE DRAWING

The Figure of Drawing is a schematic/diagrammatic illustration of one embodiment of the process/apparatus of the present invention.

DETAILED DESCRIPTION OF THE PREFERRED EMBODIMENT OF THE INVENTION

More particularly according to the present invention, an aqueous basic solution is used as the aqueous phase (B) and, moreover, the gallium values are then extracted from such aqueous basic solution (B), in a second extraction stage, by contacting same with a medium (II) containing a gallium-extracting agent, whereby said gallium values are transferred from the basic solution (B) into the medium (II). Then, after separation of the basic solution (B) from the medium (II), the gallium values are again back-extracted by contacting the gallium-enriched medium (II) with an aqueous solution (C) and an aqueous gallium solution is recovered by phase separation of the solution (C) from the medium (II). This solution (C) has a higher gallium concentration than the basic solution (B).

The extractants contained in the media (I) and (II) may be identical or different.

In a preferred embodiment of the invention, the two extractants are identical. Advantageously, at least a fraction of the medium (II) can be recycled into the medium (I), either directly after back-extraction of the gallium, or after appropriate treatment thereof, such as washing.

Exemplary of the extracting agents suitable for use according to the invention are, in particular, the substituted hydroxyquinolines.

Suitable such substituted hydroxyquinolines are those capable of extracting gallium by complexation under the operating conditions of the process of the invention, in particular in a basic medium. Moreover, they must be soluble in an organic medium and insoluble, or distinctly less soluble, in aqueous media.

Thus, the substituted hydroxyquinolines that are particularly suitable according to the present invention are those of the following general formula:

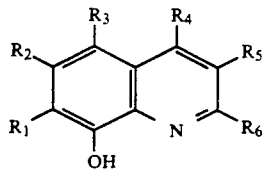

in which $R_1$, $R_2$, $R_3$, $R_4$, $R_5$ and $R_6$, which may be identical or different, are each a hydrogen or halogen atom, or an alkyl, alkenyl, alicyclic or aryl radical; with the proviso that $R_1$, $R_2$, $R_3$, $R_4$, $R_5$ and $R_6$ cannot simultaneously all be hydrogen. Exemplary of such substituted hydroxyquinolines, particularly representative are the α-alkenyl-8-hydroxyquinolines, the β-alkenyl-8-hydroxyquinolines and the alkyl-8-hydroxyquinolines.

The preferred α-alkenyl-8-hydroxyquinolines according to the invention have the general formula:

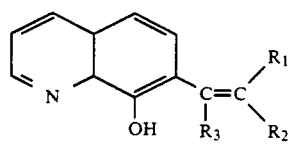

in which $R_1$, $R_2$ and $R_3$ are each a hydrogen atom or a hydrocarbon radical. Particularly preferred are those of the general formula:

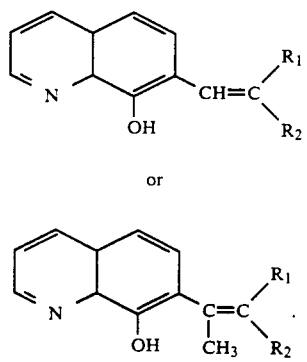

The preferred β-alkenyl-8-hydroxyquinolines according to the invention have the general formula:

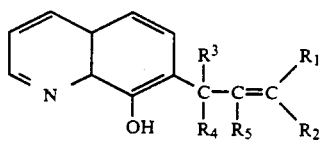

in which $R_1$, $R_2$, $R_3$, $R_4$ and $R_5$ are each a hydrogen atom or a hydrocarbon radical.

The preferred alkyl-8-hydroxyquinolines according to the invention have the formula:

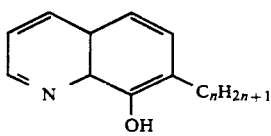

in which n is an integer ranging from 1 to 20 and preferably from 5 to 15.

The above hydroxyquinolines can be used either alone or as a mixture thereof.

These extractants can be used either in solution in an organic solvent, the extraction being carried out by the process designated "liquid/liquid extraction", or impregnated onto or supported by a porous substrate retaining same, the extraction being carried out by flowing the solution containing the gallium values over this porous substrate charged or loaded with the extractant.

In the first embodiment of the process, the medium (I) and/or the medium (II) is an organic phase containing a water-immiscible organic solvent and one or more extracting agents as described above.

The organic solvents which are suitable and customarily used are, for example, the diluents used in liquid/liquid extraction, either alone or as a mixture thereof. Exemplary such diluents include the aliphatic hydrocarbons such as, for example, heptane and petroleum cuts of the kerosene type; the aromatic hydrocarbons such as, for example, benzene, toluene, xylene and the cuts of SOLVESSO type (registered trademark of EXXON) and, finally, the halogenated derivatives of these compounds such as, for example, chloroform and carbon tetrachloride, dichloroethane and trichloropropane.

The proportion or amount of the extractants in the organic phase is not critical and may vary over wide limits.

However, a concentration ranging from 1% to 50% by volume relative to the organic phase is typically suitable.

The organic phase may also contain various additives such as, for example, gallium extraction rate accelerators and surface-active agents to promote the mixing of the phases. This list is not exhaustive and is presented strictly by way of illustration.

In the second embodiment of the process, the medium (I) and/or the medium (II) is a solid and porous substrate onto which the extractant is fixed chemically or physically.

In general, this substrate is advantageously an ion adsorbent or a synthetic ion-exchange resin, such as the resins marketed under the trademarks "Amberlite", the "caged" resins marketed by Bayer under the trademark "LEWATIT", active charcoals or analogous materials.

Exemplary such resins are described, in particular, in Japanese Patents Nos. 60/042,234 and 58/96,831 and European Patents Nos. 258,146 and 265,356.

The concentration, phase ratio, temperature and pH conditions for the extraction of gallium from the basic solution (A) into the medium (I) are per se conventional and described, in particular, in the abovementioned patents and patent applications.

By "basic solution (A) which comprises gallium values" is intended any basic solution, whether man-made or originating from chemical processes such as the processes for the treatment or digestion of natural minerals.

Thus, the basic solution characteristically used as the source of gallium is a sodium aluminate solution, also referred to as "Bayer liquor", originating from the treatment cycle for bauxite minerals for the extraction of alumina therefrom by the Bayer process. This basic solution is recycled into the Bayer process cycle after extraction of the gallium values therefrom.

In a characteristic feature of the invention, the gallium values transferred into the medium (I) after separation from the basic solution are back-extracted from such medium by contacting same with a strong base solution (B).

A sodium hydroxide solution is a preferred strong base solution (B) according to the invention, in particular when the solution (A) contains sodium ions. However, other hydroxides, such as the other alkali metal hydroxides, can also be used.

The hydroxide concentration in this solution advantageously ranges from 4N to 20N, preferably from 6N to 12N.

This back-extraction by means of a strong base solution enables a gallium solution to be produced that has a higher concentration than that in solution (A) and avoids a significant consumption of the acid required to neutralize the basicity of the medium (I) due to the coextraction of the sodium ions.

The basic gallium solution obtained contains numerous impurities in more or less high concentration, such as, in particular, aluminum and sodium. In addition, this basic solution has a pH which is frequently too high and a gallium concentration too low to be used directly in processes for the production of gallium metal, such as, for example, electrolysis.

The process of the invention permits such gallium solutions having a suitable pH and a suitable gallium concentration to be produced by conducting a second extraction of gallium values from the basic solution (B) by means of the medium (II) and back-extraction of the gallium contained in the medium (II) by a solution (C).

This aqueous solution (C) can be an acid solution, such as a solution of hydrochloric acid, nitric acid, sulfuric acid, a mixture of acids or other suitable materials.

This recovery of gallium values using an acid solution can be carried out by a variety of techniques.

Thus, it is possible to back-extract the gallium using a concentrated solution of strong acids in a single step, or to extract only the sodium and the aluminum with a dilute solution of strong acids in a first step and then to back-extract the gallium with a concentrated solution of strong acids in a second step.

In these embodiments, the extracting solvent is subjected to washing before it is recycled in order, thus, to avoid the presence of acid during the extraction of the gallium values.

These various embodiments for back-extraction of the gallium using a solution of strong acids are described in the aforementioned patents, hereby expressly incorporated by reference.

The aqueous solution (C) can also be a solution of a strong base, such as a solution of sodium hydroxide or of another alkali metal hydroxide. In this event, the pH of the basic solution must range from 4N to 20N and preferably from 6N to 12N.

By means of this double extraction, or extraction in two cycles, of the gallium values, the process of the invention enables a gallium solution to be produced which is compatible with the processes for the production of gallium metal, from the point of view of purity, pH or gallium content.

In a preferred embodiment of the invention, the basic solution (B) charged with gallium values is diluted before being contacted with the medium (II) in order, thus, to provide the pH and concentration conditions compatible with a gallium partition coefficient between the aqueous solution and the medium (II).

This dilution is necessary, in particular, when the medium (II) is similar to the medium (I), notably when the nature of the extracting agent, the solvent or the substrate is identical.

However, this dilution of the solution (B) is not required if the media (I) and (II) are different in respect of their nature or concentration.

In another embodiment of the invention, the basic solution (B) recovered after it has been contacted with the medium (II) and thus after extraction of the gallium can be at least partially recycled into the basic solution (A) from which the gallium has been removed. This recycling is particularly beneficial from the standpoint of the economics of the process when the basic solution (A) is a Bayer liquor. Indeed, in a Bayer cycle for the production of alumina, sodium hydroxide is one of the reactants consumed. Consequently, the sodium hydroxide which is used to extract the gallium and is then re-injected into the Bayer liquor constitutes a fraction of the sodium hydroxide consumed by the Bayer cycle.

In another embodiment of the invention, the medium (II) containing an extracting agent can be at least partially recycled into the medium (I), if appropriate after a treatment such as washing.

Referring specifically to the single Figure of Drawing, a Bayer liquor is introduced ia line 1 into a liquid/liquid extraction battery 2 comprising several mixer/settler stages and exits this battery via outlet 3. An organic solution (medium I) containing an extractant is introduced countercurrently to the flow of Bayer liquor in the battery 2.

The organic phase enriched in gallium values exits the battery 2 via line 5 and is charged into a second extraction battery 4. The organic phase from which the gallium values have been removed exits the battery 4 to be recycled into the first battery 2 via the loop 6.

A basic solution (B) is countercurrently introduced, via line 7, into the battery 4 and exits via line 8 enriched in gallium values.

The basic solution (B) charged with gallium values is transported, if appropriate after dilution by the addition of water via line 9, into a liquid/liquid extraction battery 10.

This basic solution, from which the gallium has been removed, exits the battery 10 via line 11 and is recycled, if appropriate after evaporation in evaporator 12, into the Bayer liquor in line 3 from which the gallium has been removed.

A second organic phase (medium II) is introduced via line 13, countercurrently, into the extraction battery 10. The organic phase charged with gallium exiting the battery 10 at outlet 14 is introduced into a battery 15 of mixer/settlers and exits the latter to be recycled into the battery 10 via the loop 16.

An aqueous solution (C) is introduced via line 17 into the battery 15, countercurrently to the organic phase. This solution charged with gallium exits the battery 15 via outlet 18.

It is, of course, possible to replace the liquid/liquid extraction batteries by other apparatus suited, in particular, to the use of porous substrates loaded with extracting agent. Thus, a column filled with resin or a battery of columns can be used.

Moreover, it is possible to provide treatments of the organic phase (medium I or medium II) before it is recycled into the extraction batteries. Such a treatment can be washing with water or with a weakly basic solution, in particular for the medium (II).

The operating conditions of the extraction batteries can be very different. Thus, it is possible to conduct the operation under an inert atmosphere or in the absence of an atmosphere, for example.

Moreover, the hydrodynamic operating conditions of the extraction batteries, such as the flow rates of organic phase and aqueous phase, the stirring speeds of the mixers and the settling conditions are conventional to this art, and are described, for example, in the above patents.

In order to further illustrate the present invention and the advantages thereof, the following specific examples are given, it being understood that same are intended only as illustrative and in nowise limitative.

In said examples to follow, the operations described were carried out as shown in the attached Figure of Drawing and the appropriate reference numerals are provided.

EXAMPLE 1

A sodium aluminate solution originating from a Bayer cycle for the production of alumina, i.e., a "Bayer liquor", having the following composition was introduced into a battery of mixer/settlers:
$Al_2O_3$: 80 g/l
NaO: 205 g/l
Ga: 225 mg/l.

A solvent of extraction containing 0.25 mol/l of a substituted hydroxyquinoline, including a saturated hydrocarbon substituent and marketed by Schering under the trademark "Kelex 100", dissolved in kerosene was introduced into the battery 2. This solvent also contained 10% by weight of decanol and 0.25 mol/l of "versatic 10" acid.

The solvent exiting the extraction battery 2 was introduced into a second battery 4 in which the gallium values were back-extracted using a 9N sodium hydroxide solution.

The sodium hydroxide solution charged with gallium values contained 1.35 g/l of gallium and 9 g/l of aluminum.

Before being transported into a second extraction/back-extraction cycle, this sodium hydroxide solution was diluted by the addition of water to provide an $[OH]^-$ concentration equal to 3N.

In this second extraction/back-extraction cycle, an extracting solvent was used which was identical to that used in the first cycle.

The gallium was back-extracted from the organic phase using 8N sulfuric acid solution. The acid solution recovered contained 18 g/l of gallium, 3.6 g/l of aluminum and 754 g/l of $SO_4^{2-}$ and had a $H^+$ concentration equal to 4N.

This acid gallium solution can be purified and used in processes for the production of gallium metal, such as electrolysis.

The solvent of extraction exiting the backextraction battery was washed with water to remove the impurities present, such as sulfates. The washing water was advantageously mixed with the acid solution used for the back-extraction of the gallium.

In addition, the sodium hydroxide solution recovered at the back-extraction stage 10 of the second cycle, which contained 3 g/l of aluminum and had a sodium hydroxide concentration of 3N, was recycled back into the Bayer liquor from which the gallium had been removed.

EXAMPLE 2

The first gallium extraction cycle was identical to that of Example 1 and a basic solution containing 1.35 g/l of gallium and 9 g/l of aluminum was recovered.

This solution was diluted to provide an $OH^-$ concentration equal to about 3N and was then contacted with an extracting solvent identical to that of Example 1 in an extraction battery, using a ratio of the flow rates to provide an organic phase/aqueous phase ratio equal to 0.1.

The solution of sodium hydroxide from which the gallium values had been removed was then recycled into the Bayer liquor, as in Example 1.

The solvent of extraction enriched in gallium values was contacted, in a liquid/liquid extraction battery, with a sodium hydroxide solution having an initial concentration equal to 9N using an organic phase/aqueous phase ratio of 6.

A sodium solution was obtained containing, in particular:
Ga $(OH)^-_4$: 27.5 g/l expressed as Ga
Al $(OH)^-_4$: 5.5 g/l expressed as Al
$[OH^-]$: 7.25N.

This solution can be subjected to electrolysis to produce gallium metal, on the one hand, and an electrolyte impoverished in gallium which can be recycled into one of the batteries for the back-extraction of the gallium.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the recovery of gallium values from a basic aqueous solution (A) thereof, comprising (i) contacting such basic aqueous solution (A) with a medium (I) containing a gallium extractant, whereby said gallium values are transferred to said medium (I), (ii) contacting said gallium-enriched medium (I) with a basic aqueous solution (B) and back-extracting said gallium values to said basic aqueous solution (B), (iii) contacting said gallium-enriched basic aqueous solution (B) with a second medium (II) containing a gallium extractant, whereby said gallium values are transferred to said medium (II), and (iv) contacting said gallium-enriched medium (II) with an aqueous solution (C) and back-extracting said gallium values into said aqueous solution (C), wherein said basic aqueous solution (B) is diluted prior to contact with said second medium (II).

2. The process as defined by claim 1, further comprising (v) separating said gallium-enriched aqueous solution (C) from said medium (II).

3. The process as defined by claim 2, further comprising recovering said gallium values from said aqueous solution (C).

4. The process as defined by claim 2, further comprising purifying gallium-enriched aqueous solution (C).

5. The process as defined by claim 2, further comprising producing gallium metal or a gallium compound from said gallium-enriched aqueous solution (C).

6. The process as defined by claim 1, wherein said basic aqueous solution (B) has an $OH^-$ ion concentration ranging from 4N to 20N.

7. The process as defined by claim 6, wherein said aqueous solution (C) has an $H^+$ ion concentration ranging from 6N to 11N.

8. The process as defined by claim 1, wherein said medium (I) comprises an organic solvent solution of a gallium extractant.

9. The process as defined by claim 8, wherein said medium (II) comprises an organic solvent solution of a gallium extractant.

10. The process as defined by claim 9, further comprising at least in part recycling the medium (II), subsequent to the back-extraction thereof, into said medium (I) prior to contacting same with said basic aqueous solution (A).

11. The process as defined by claim 1, wherein said medium (I) comprises a solid porous support having a gallium extractant deposited thereon.

12. The process as defined by claim 11, wherein said medium (II) comprises a solid porous support having a gallium extractant deposited thereon.

13. The process as defined by claim 11, wherein said solid porous support comprises a synthetic resin or active charcoal.

14. The process as defined by claim 13, said solid porous support comprises an ion-adsorbent or ion-exchange resin.

15. The process as defined by claim 1, wherein at least one of said gallium extractants comprises a substituted hydroxyquinoline.

16. The process as defined by claim 15, wherein said substituted hydroxyquinoline comprises an alkenyl substituted 8-hydroxyquinoline.

17. The process as defined by claim 15, wherein said substituted hydroxyquinoline comprises an alkyl substituted 8-hydroxyquinoline.

18. The process as defined by claim 1, wherein said basic aqueous solutions (A) and (B) comprises sodium hydroxide solutions.

19. The process as defined by claim 1, wherein said aqueous solution (C) comprises sulfuric, nitric or hydrochloric acid.

20. The process as defined by claim 1, wherein said aqueous solution (C) comprises a strong base.

21. The process defined by claim 1, further comprising at least in part recycling the basic aqueous solution (B) depleted of gallium values into said basic aqueous solution (A) subsequent to extracting the gallium values therefrom.

22. The process as defined by claim 21, further comprising concentraing said gallium-depleted basic aqueous solution (B) prior to the recycling thereof.

23. The process as defined by claim 1, wherein said basic aqueous solution (A) of gallium values comprises a Bayer liquor.

24. A process for the recovery of gallium values from a basic aqueous solution (A) thereof, comprising (i) contacting such basic aqueous solution (A) with a medium (I) containing a gallium extractant, whereby said gallium values are transferred to said medium (I), (ii) contacting said gallium-enriched medium (I) with a basic aqueous solution (B) and back-extracting said gallium values to said basic aqueous solution (B), (iii) contacting said gallium-enriched basic aqueous solution (B) with a second medium (II) containing a gallium extractant, whereby said gallium values are transferred to said medium (II), and (iv) contacting said gallium-enriched medium (II) with an aqueous solution (C) and back-extracting said gallium values into said aqueous solution (C), wherein said extract in said medium (I) is identical to said extractant in said medium (II).

25. The process as defined by claim 24, wherein said basic aqueous solution (B) is diluted prior to contact with said second medium (II).

26. The process as defined in claim 25, wherein said basic aqueous solution (B) has an $OH^-$ ion concentration ranging from 4N to 20N.

* * * * *